United States Patent [19]
Zander et al.

[11] Patent Number: 5,903,789
[45] Date of Patent: May 11, 1999

[54] CAMERA WITH ACTUATOR FOR OPENING CLOSED DOOR AND RETRACTING SPROCKET WHEEL FROM FILM ENGAGEABLE POSITION

[75] Inventors: Dennis R. Zander, Penfield; Timothy A. Peter, Sr., Hilton, both of N.Y.

[73] Assignee: Eastman Kodak Company, Rochester, N.Y.

[21] Appl. No.: 08/898,095

[22] Filed: Jul. 22, 1997

[51] Int. Cl.⁶ ................................................ G03B 17/00
[52] U.S. Cl. ........................................ 396/411; 396/536
[58] Field of Search .................................. 396/387, 395, 396/396, 411, 415, 439, 535, 536

[56] References Cited

U.S. PATENT DOCUMENTS

| | | | |
|---|---|---|---|
| 3,319,550 | 5/1967 | Broche | 396/410 |
| 3,994,006 | 11/1976 | Ichii | 396/417 |
| 4,239,362 | 12/1980 | Katayama et al. | 396/415 |
| 5,493,358 | 2/1996 | Janson, Jr. | 396/442 |

*Primary Examiner*—Safet Metjahic
*Assistant Examiner*—J. K. Han
*Attorney, Agent, or Firm*—Roger A. Fields

[57] ABSTRACT

A camera including a normally closed door moveable to be opened, and a sprocket wheel retractable from a film engageable position, is characterized in that an actuator is moveable simultaneously to move the door open and to retract the sprocket wheel from its film engageable position.

8 Claims, 4 Drawing Sheets

CAMERA WITH ACTUATOR FOR OPENING CLOSED DOOR AND RETRACTING SPROCKET WHEEL FROM FILM ENGAGEABLE POSITION

CROSS-REFERENCE TO RELATED APPLICATION

Reference is made to commonly assigned application Ser. No. 08/898,096 entitled CAMERA WITH ACTUATOR FOR MOVING SPROCKET WHEEL TO FILM ENGAGING POSITION WHEN DOOR CLOSED and filed Jul. 22, 1997 now U.S. Pat. No. 5,799,220 in the name of Dennis R. Zander.

FIELD OF THE INVENTION

The invention relates generally to the field of photography, and in particular to cameras. More specifically, the invention relates to a camera with an actuator for simultaneously opening a closed door and retracting a sprocket wheel from a film engageable position.

BACKGROUND OF THE INVENTION

Commonly assigned U.S. Pat. No. 5,493,358 issued Feb. 20, 1996 discloses a camera including a normally closed door moveable to be opened, and a sprocket wheel retractable from a film engageable position. When the door is opened, a return spring is allowed to urge a pivot a link bar on which the sprocket wheel is rotatably supported to the film engageable position.

THE CROSS-REFERENCED APPLICATION

The cross-referenced application discloses a camera comprising a door moveable to be closed, a sprocket wheel having respective teeth for entering successive spaced perforations in a filmstrip to engage the filmstrip and being moveable to a film engaging position for one of the teeth to enter one of the film perforations, and an actuator moveable to move the sprocket wheel to its film engaging position when the door is moved to be closed. The actuator has a compliant member which yields elastically when the actuator is moved to move the sprocket wheel to its film engaging position, but one of the teeth comes to rest against a limited section of the filmstrip between two of the film perforations rather than the tooth entering one of the perforations. Thus, the compliant member acts to prevent the tooth from perforating the limited section of the filmstrip.

SUMMARY OF THE INVENTION

A camera comprising a normally closed door moveable to be opened, and a sprocket wheel retractable from a film engageable position, is characterized in that:

an actuator is moveable simultaneously to move the door open and to retract the sprocket wheel from its film engageable position.

DETAILED DESCRIPTION OF THE INVENTION

Figure 1:
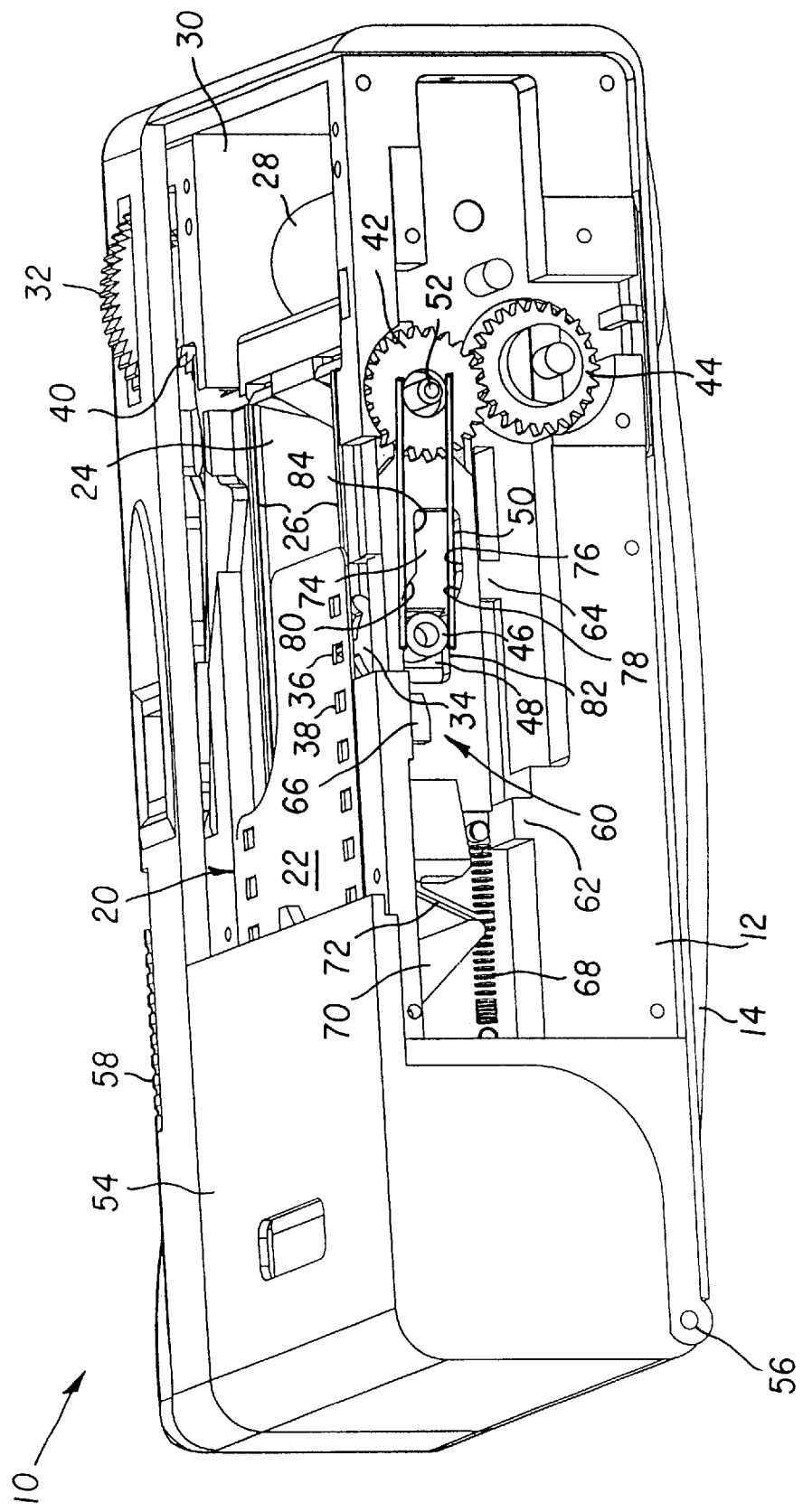
FIG. 1 is a rear perspective view of a camera according to a preferred embodiment of the invention, showing a rear door for a cartridge receiving chamber closed.

The invention is disclosed as being embodied preferably in a camera. Because the features of a camera are generally known, the description which follows is directed in particular only to those elements forming part of or cooperating directly with the disclosed embodiment. It is to be understood, however, that other elements may take various forms known to a person of ordinary skill in the art.

Referring now to the drawings, FIGS. 1–4 partially show a camera 10 comprising a main body part or frame 12 and a front cover part 14. A combined rear and bottom cover part is not shown in order to be able to depict interior components of the camera 10.

The main body part 12 includes a cartridge receiving chamber 16 for a conventional 35 mm film cartridge 18 that has a filmstrip 20 with a protruding leader portion 22, a backframe opening 24 for exposing successive imaging areas of the filmstrip, a parallel pair of identical film rails 26 for supporting each of the imaging areas in a film exposure plane at the backframe opening, an exposed film take-up spool 28 rotatably supported in a take-up chamber 30, a manually rotatable thumbwheel 32 coaxially connected to the spool for being rotated in a film take-up direction (clockwise in FIG. 1) to similarly rotate the spool, and a sprocket wheel 34 having respective evenly spaced teeth 36 for entering successive similarly spaced perforations 38 in the filmstrip to drivingly engage the filmstrip. The thumbwheel 32 is drivingly connected to the sprocket wheel 34 via a gear and shaft train, which includes gears 40, 42 and 44, to cause rotation of the thumbwheel in the film take-up direction (clockwise in FIG. 1) to similarly rotate the sprocket wheel. The sprocket wheel 34 has a central hub 46 that protrudes through a slot 48 in the main body part 12 to be end-connected to a pivot arm 50 to rotatably support the sprocket wheel. The pivot arm 50 is pivotable about a shaft end 52 to move the sprocket wheel 34 between a film engaging position for one of the sprocket teeth 36 to enter one of the film perforations 38, as shown in FIGS. 1 and 2, and retracted from the film engaging position to separate the sprocket tooth from the film perforation, as shown in FIG. 3 and 4.

A rear door 54 is pivotally connected to the main body part 12 at a pivot pin 56 for opening movement to uncover the cartridge receiving chamber 16 and for closing movement to light-tightly cover the cartridge receiving chamber. A manual latching slide 58 for normally securing the rear door 54 closed in a well known way is translated to the right in FIG. 1, against the reverse urging of a return spring (not shown), to release the rear door, to permit the rear door to be opened. See FIG. 3.

Figure 2:
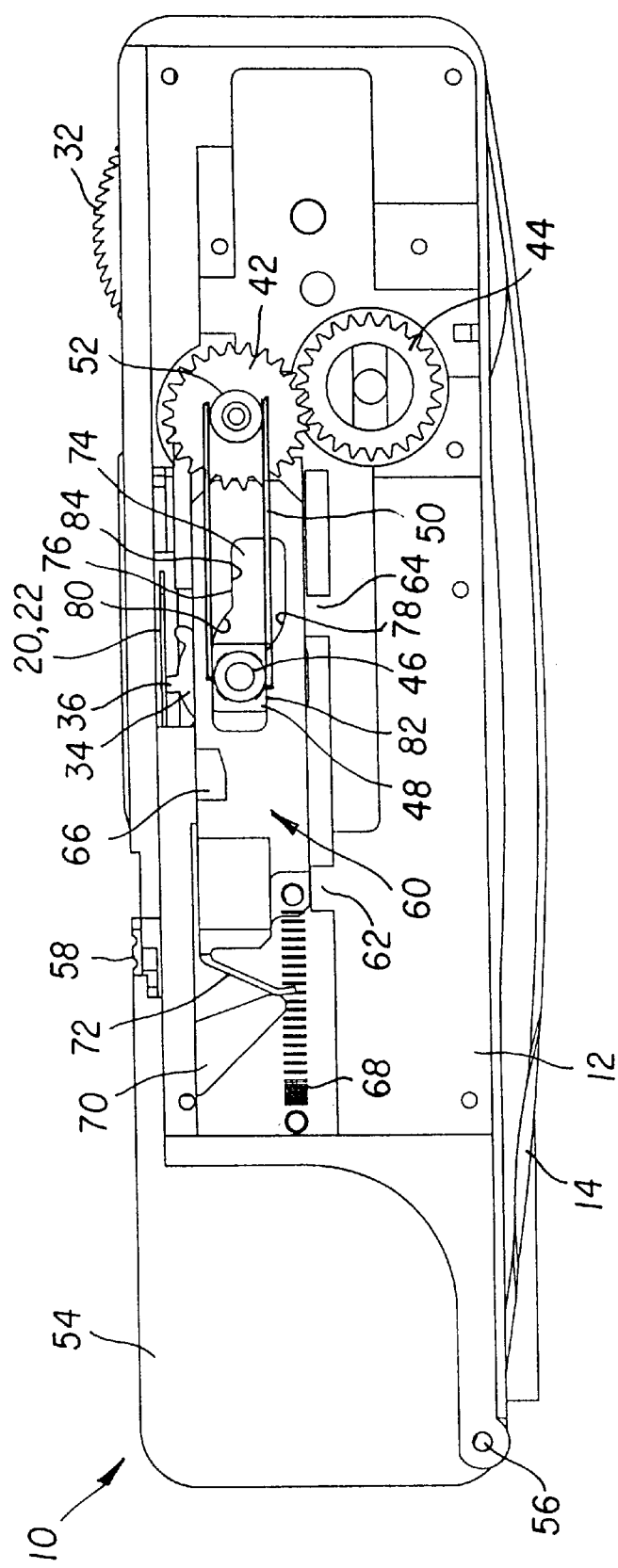
FIG. 2 is a side elevation view of the camera as shown in FIG. 1.
Figure 3:
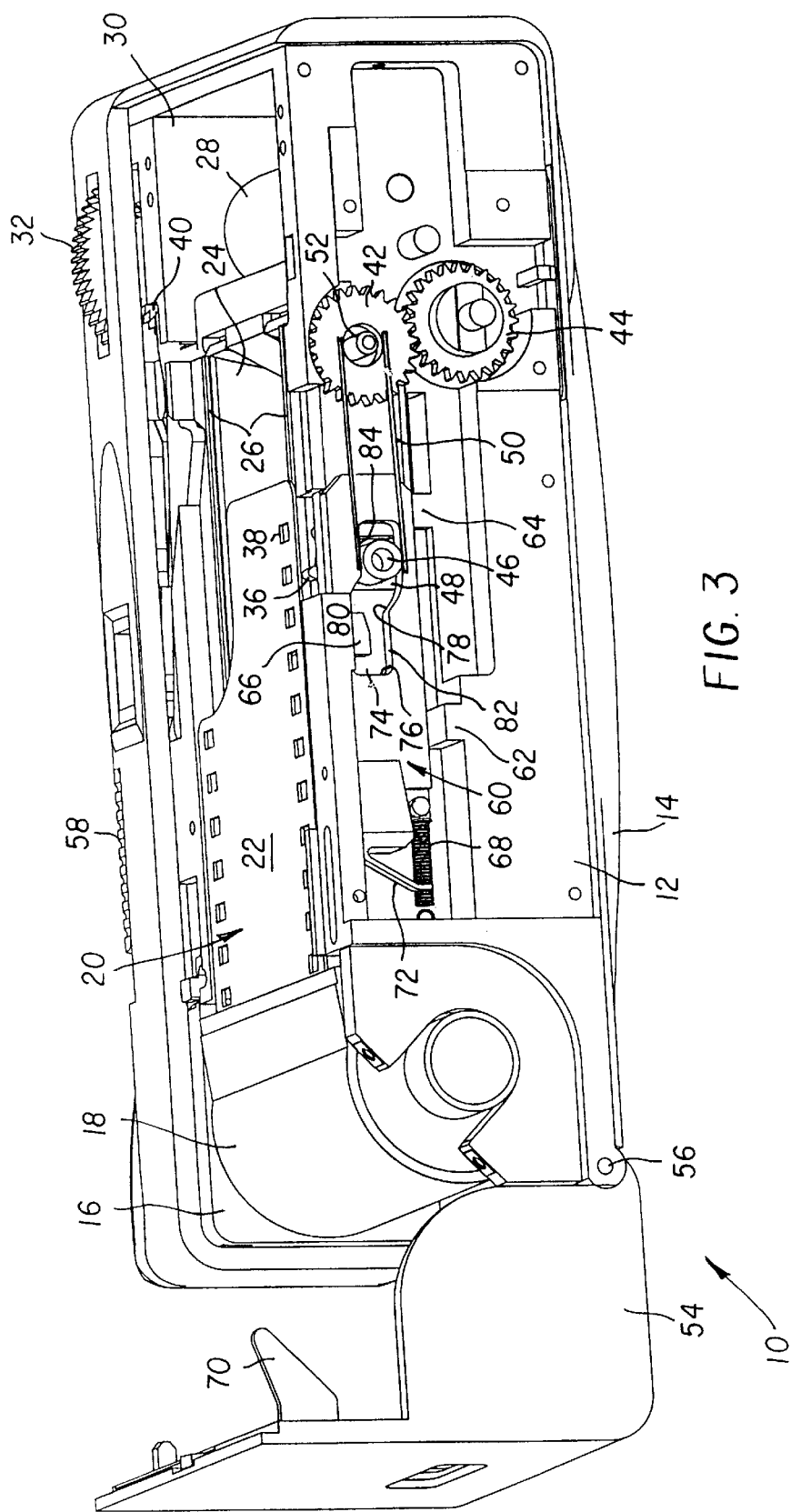
FIG. 3 is a is a rear perspective view of the camera, showing the rear door opened.
Figure 4:
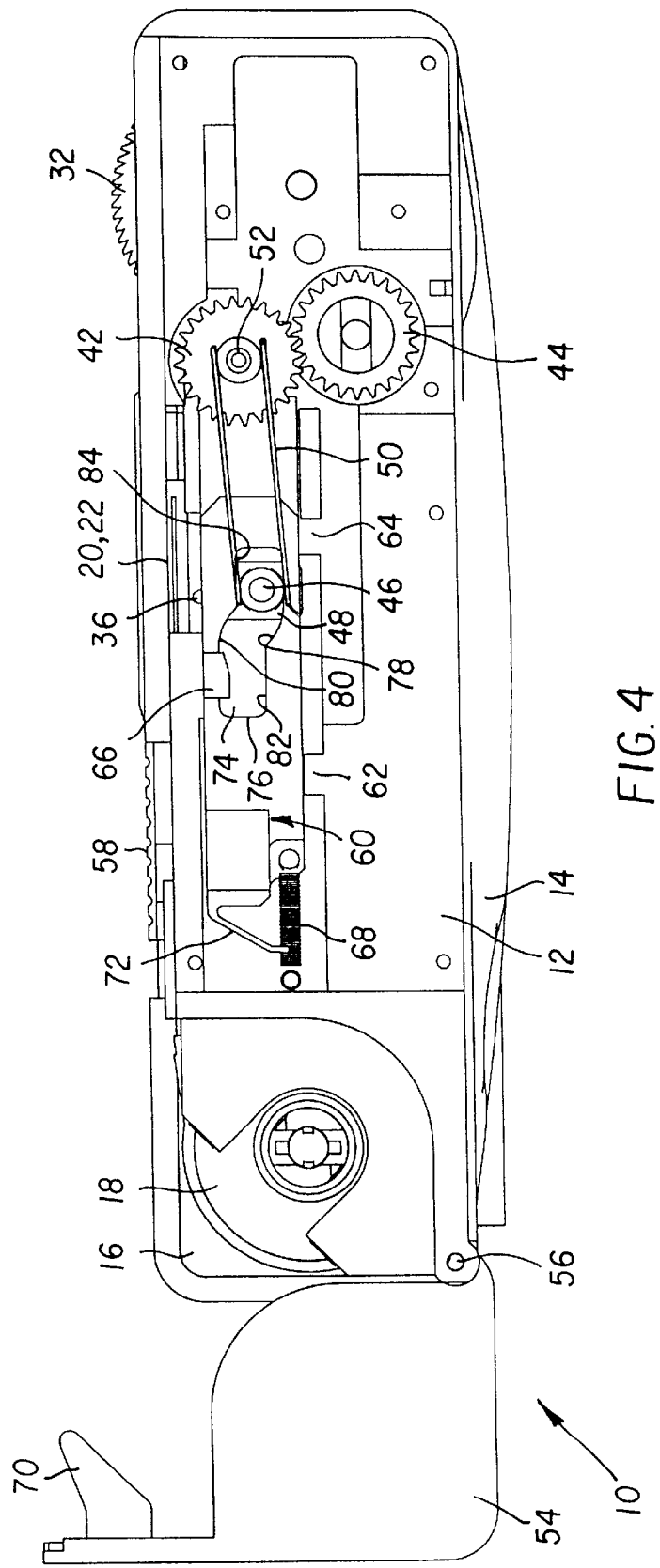
FIG. 4 is a side elevation view of the camera as shown in FIG. 3.

An actuator slide 60 is supported at several fixed supports 62, 64 and 66 of the main body part 12 for translation to the left in FIGS. 1 and 2 and to the right in FIGS. 3 and 4. A helical tension spring 68 has its opposite ends connected to the main body part 12 and to the actuator slide 60 to urge the actuator slide to the left in FIGS. 1 and 2. A finger-like rigid projection 70 of the rear door 54 abuts a resilient (compliant) inclined cantilevered extension 72 of the actuator slide 60, when the latching slide 58 secures the rear door closed. The cantilevered extension 72 is less compliant than the tensile (pulling) force the spring 68 exerts on the actuator slide in FIGS. 1 and 2, to prevent the cantilevered extension from yielding elastically to the tensile force of the spring.

The sprocket hub 46 extends through an elongate opening 74 in the actuator slide 60 that is defined by a continuous cam profile 76. The cam profile 76 has a rigid inclined positioning edge 78 that is moved against the sprocket hub 46 to pivot the sprocket wheel 34 to its film engaging position in FIGS. 1 and 2, when the actuator slide 60 is translated to the right in FIGS. 3 and 4, and a rigid inclined retracting edge 80 that is moved against the sprocket hub to retract the sprocket wheel from its film engaging position, when the actuator slide 60 is translated to the left in FIGS. 1 and 2. A rigid terminal edge 82 of the cam profile 76 that is located adjacent the inclined positioning edge 78 longitudinally extends parallel to the two film rails 26 to support the sprocket hub 46 to hold the sprocket wheel 34 in the film engaging position, and a rigid terminal edge 84 of the cam profile that is located adjacent the inclined retracting edge 80 longitudinally extends parallel to the two film rails to support the sprocket hub to hold the sprocket wheel retracted from the film engaging position.

Operation

When the latching slide 58 is manually translated to the right in FIG. 1, contrary to the reverse urging of the return spring (not shown), to release the rear door, to permit the rear door to be opened, the helical tension spring 68 is free to automatically (spontaneously) translate the actuator slide 60 to the left in FIGS. 1 and 2. When the spring 68 translates the actuator slide 60 to the left in FIGS. 1 and 2, the cantilevered extension 72 of the actuator slide is pulled against the projection 70 of the rear door 54 to pivot the rear door open. See FIGS. 3 and 4. Concurrently, the inclined retracting edge 80 of the cam profile 76 is moved against the sprocket hub 46 to retract the sprocket wheel 34 from its film engaging position. Then, the terminal edge 84 of the cam profile 76 that is located adjacent the inclined retracting edge 80 supports the sprocket hub 46 to hold the sprocket wheel 34 retracted from the film engaging position. See FIGS. 3 and 4.

When the rear door 54 is manually closed, the projection 70 of the rear door is swung against the cantilevered extension 72 of the actuating slide 60 to translate the actuating slide to the right in FIGS. 1 and 2 contrary to the reverse urging of the spring 68. Concurrently, the inclined positioning edge 78 of the cam profile 76 is moved against the sprocket hub 46 to pivot the sprocket wheel 34 to its film engaging position. Then, the terminal edge 82 of the cam profile 76 that is located adjacent the inclined positioning edge 78 supports the sprocket hub 46 to hold the sprocket wheel 34 in the film engaging position. See FIGS. 1 and 2.

If the sprocket wheel 34 is pivoted towards its film engaging position, but one of the sprocket teeth 36 comes to rest against a narrow section of the filmstrip 20 between two of the film perforations 38 rather than the tooth entering one of the perforations, the cantilevered extension 72 of the actuator slide 60 will yield elastically in deference to the projection 70 of the rear door 54. This prevents the tooth from perforating the narrow section of the filmstrip.

The invention has been described with reference to a preferred embodiment. However, it will be appreciated that variations and modifications can be effected by a person of ordinary skill in the art without departing from the scope of the invention.

PARTS LIST 10. camera
12. main body part
14. front cover part
16. cartridge receiving chamber
18. film cartridge
20. filmstrip
22. protruding leader portion
24. backframe opening
26. pair of film rails
28. exposed film take-up spool
30. take-up chamber
32. thumbwheel
34. sprocket wheel
36. sprocket teeth
38. film perforations
40. gear
42. gear
44. gear
46. sprocket hub
48. slot
50. pivot arm
52. shaft end
54. rear door
56. pivot pin
58. latching slide
60. actuator slide
62. fixed support
64. fixed support
66. fixed support
68. helical tension spring
70. projection
72. inclined cantilevered extension
74. elongate opening
76. cam profile
78. inclined positioning edge
80. inclined retracting edge
82. terminal edge
84. terminal edge

What is claimed is:

1. A camera comprising a door moveable to be opened, and a sprocket wheel retractable from a film engageable position, is characterized in that:

a latch for securing said door closed is supported to be manually moved to release the door to permit the door to be opened; and an actuator is supported for movement to simultaneously both move said door open and retract said sprocket wheel from its film engageable position automatically when said latch has been moved to release the door to permit the door to be opened.

2. A camera as recited in claim 1, wherein said door is supported to be pivoted to open, and said actuator is supported to be translated to simultaneously both pivot said door open and retract said sprocket wheel from its film engageable position.

3. A camera as recited in claim 2, wherein said actuator includes a cam for retracting said sprocket wheel from its film engageable position when the actuator is translated to pivot said door open.

4. A camera as recited in claim 3, wherein said cam has a rigid terminal edge that extends in the same direction as said actuator is translated for supporting said sprocket wheel in the film engageable position.

5. A camera as recited in claim 4, wherein a parallel pair of film rails define a film exposure plane, and said rigid terminal edge longitudinally extends parallel to said film rails to support said sprocket wheel relative to the film exposure plane.

6. A camera as recited in claim 5, wherein said sprocket wheel has a central hub, and said rigid terminal edge supports said central hub when said sprocket wheel is in the film engageable position.

7. A camera as recited in claim 2, wherein said sprocket wheel is supported to be pivoted from its film engageable position, and said actuator includes a cam for pivoting said sprocket wheel from its film engageable position when the actuator is translated to pivot said door open.

8. A camera comprising a door moveable to be opened, and a sprocket wheel retractable from a film engageable position, is characterized in that:

an actuator is supported for movement to simultaneously both move said door open and retract said sprocket wheel from its film engageable position; and a spring is connected to said actuator and has sufficient force to move the actuator for the actuator to simultaneously both move said door open and retract said sprocket wheel from its film engageable position.

* * * * *